(12) United States Patent
Irving, Jr.

(10) Patent No.: US 10,212,000 B1
(45) Date of Patent: Feb. 19, 2019

(54) COMPUTER VISION BASED ACTIVATION

(71) Applicant: DAQRI, LLC, Los Angeles, CA (US)

(72) Inventor: Frank Chester Irving, Jr., Woodland Hills, CA (US)

(73) Assignee: DAQRI, LLC, Los Angeles, CA (US)

( * ) Notice: Subject to any disclaimer, the term of this patent is extended or adjusted under 35 U.S.C. 154(b) by 0 days.

(21) Appl. No.: 15/659,180

(22) Filed: Jul. 25, 2017

(51) Int. Cl.
*H04L 12/28* (2006.01)
*G06K 9/00* (2006.01)
*G06T 19/00* (2011.01)
*G06F 3/01* (2006.01)

(52) U.S. Cl.
CPC .......... *H04L 12/2829* (2013.01); *G06F 3/011* (2013.01); *G06K 9/00664* (2013.01); *G06T 19/006* (2013.01)

(58) Field of Classification Search
CPC . H04L 12/2829; G06F 3/011; G06K 9/00664; G06T 19/006
See application file for complete search history.

(56) References Cited

U.S. PATENT DOCUMENTS

| | | | | |
|---|---|---|---|---|
| 9,489,040 | B2* | 11/2016 | Antonyuk | G06T 19/006 |
| 2013/0328763 | A1* | 12/2013 | Latta | G06F 3/017 |
| | | | | 345/156 |
| 2014/0028712 | A1* | 1/2014 | Keating | G06T 19/006 |
| | | | | 345/633 |
| 2014/0063060 | A1* | 3/2014 | Maciocci | G06F 3/011 |
| | | | | 345/633 |
| 2015/0100578 | A1* | 4/2015 | Rosen | G06F 17/30598 |
| | | | | 707/737 |
| 2015/0100803 | A1* | 4/2015 | Chen | H04L 67/025 |
| | | | | 713/320 |
| 2016/0274762 | A1* | 9/2016 | Lopez | G06T 19/006 |

* cited by examiner

*Primary Examiner* — Ryan R Yang
(74) *Attorney, Agent, or Firm* — Schwegman Lundberg & Woessner, P.A.

(57) ABSTRACT

An augmented-reality (AR) device detects a physical device located within a first predefined distance of the augmented-reality device. The AR device detects, using an optical sensor, a physical object located within a second predefined distance of the physical device, the physical object being electronically unconnected to the physical device. The AR device determines that the physical object is associated with the physical device and identifies a command based on an identification of both the physical object and the physical device. The physical device is configured to operate the command and display, in the display, virtual content as an overlay to the physical object.

20 Claims, 12 Drawing Sheets

COMPUTER VISION BASED ACTIVATION

TECHNICAL FIELD

The subject matter disclosed herein generally relates to the processing of data. Specifically, the present disclosure addresses systems and methods for remotely controlling devices.

BACKGROUND

A device can be used to generate and display data in addition to an image captured with the device. For example, augmented reality (AR) is a live, direct or indirect, view of a physical, real-world environment whose elements are augmented by computer-generated sensory input such as sound, video, graphics or GPS data. With the help of advanced AR technology (e.g. adding computer vision and object recognition) the information about the surrounding real world of the user becomes interactive. Device-generated (e.g., artificial) information about the environment and its objects can be overlaid on the real world.

BRIEF DESCRIPTION OF THE DRAWINGS

Some embodiments are illustrated by way of example and not limitation in the figures of the accompanying drawings.

DETAILED DESCRIPTION

Figure 1:
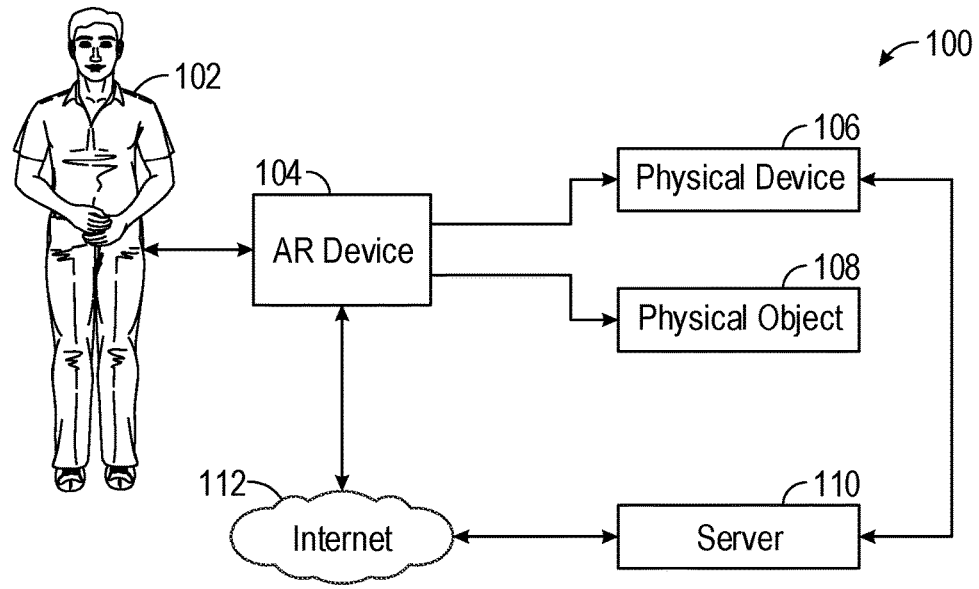
FIG. 1 is a block diagram illustrating an example of a network suitable for operating a computer vision based activation of a physical device, according to some example embodiments.

Example methods and systems are directed to remotely controlling a device by detecting an associated physical object being present in proximity (or being present in a known physical configuration such as proximity to, alignment with, or in a relative position to) to the device. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Augmented reality (AR) applications allow a user to experience information, such as in the form of a three-dimensional virtual object overlaid on a picture of a physical object captured by a camera of a device (also referred to as an augmented-reality device). The physical object may include a visual reference that the AR application can identify. For example, the AR device uses computer vision to detect and identify the physical object. A visualization of the augmented information, such as the three-dimensional virtual object overlaid or engaged with an image of the physical object is generated in a display of the device. The three-dimensional virtual object may be selected based on the recognized visual reference or captured image of the physical object. A rendering of the visualization of the three-dimensional virtual object may be based on a position of the display relative to the visual reference.

In one example, the AR device may include a head wearable device that includes a transparent display. The AR device displays the augmented information in the transparent display such that the user of the AR device perceives the augmented information as an overlay on a physical object.

The present application describes using an AR device that activates and controls a physical device (e.g., computer, smart phone, telephone, radio) by detecting that a physical object (e.g., keys, business card, kitchen utensils) associated with the physical device is in proximity to the physical device. In one example embodiment, the physical object is not electrically coupled to the physical device and does not communicate with the physical device or another other device. In another example embodiment, the physical object includes electrical components (e.g., a television remote).

For example, the television remote is not communicating or electrically coupled to the television. Therefore, a television remote without batteries can still be used to activate and control the television.

For example, the AR device includes a camera that detects and identifies a laptop. The AR device also detects that a predefined physical object (e.g., coffee mug) is placed to the right side of the laptop. The AR device detects the coffee mug using different methods such as using computer vision for object recognition or using other wireless means (e.g., bluetooth chip embedded in the coffee mug) to identify the presence of the coffee mug. Once the AR device determines that the coffee mug is associated with the laptop, the AR device displays augmented information (e.g., displaying a color filter over the coffee mug to turn it orange) and turn on the laptop. In another example, the AR device determines that the coffee mug (associated with the laptop) is placed to the left side of the laptop. The AR device displays augmented information (e.g., "sleeping five seconds" notification, or a virtual count down timer) over or above the laptop or the coffee mug as perceived by the user of the AR device.

In another example, the AR device triggers a command to turn off the television (e.g., AR device controls a smart wi-fi switch connected to the television) when the AR device detects that the television remote control is placed under the television. Conversely, the AR device triggers a command to turn on the television when the AR device detects that the television remote control is removed from a predefined location (e.g., next to the television). In yet another example, the AR device triggers a command (e.g., to the television, or a set top box connected to the television) to set the television to a first channel (e.g., channel A) when the AR device detects that the television remote control is positioned face up. Similarly, the AR device triggers a command to set the television to a second channel (e.g., channel B) when the AR device detects that the television remote control is positioned face down. The AR device displays augmented information such as "switching to channel B" over the television remote control.

In one example embodiment, the AR device includes an optical sensor and a display. The AR device detects a physical device located within a first predefined distance of the augmented-reality device. The AR device detects, using the optical sensor, a physical object located within a second predefined distance of the physical device, the physical object being electronically unconnected to the physical device. The AR device determines that the physical object is associated with the physical device, identifies a command based on an identification of both the physical object and the physical device (the physical device is configured to operate the command), and displays, in the display, virtual content as an overlay to the physical object, the virtual content identifying the command.

In another example embodiment, the AR device determines, using the optical sensor, a position of the physical object relative to the physical device, a first orientation of the physical object relative to the augmented-reality device, and a second orientation of the physical object relative to the physical device. The command is identified based on a combination of the identification of the physical object, the position of the physical object relative to the physical device, the first orientation of the physical object relative to the augmented-reality device, and the second orientation of the physical object relative to the physical device.

In another example embodiment, the AR device identifies, using the optical sensor, the physical device and the physical object. The AR device determines, using the optical sensor, that the physical object is adjacent to the physical device. The command is based on the identification of both the physical device and the physical object, and the physical object being adjacent to the physical device.

In another example embodiment, the AR device wirelessly communicates with the physical device, identifies the physical device based on the wireless communication between the augmented reality device and the physical device, determines, using the optical sensor, that the physical object is adjacent to the physical device. The command is based on the identification of both the physical device and the physical object, and the physical object being adjacent to the physical device.

In another example embodiment, the AR device communicates the command to the physical device using the wireless communication. The AR device can communicate the command to a server (the server being associated with the physical device and coupled to the physical device).

In another example embodiment, the AR device detects that the physical device has performed the command on the physical device, and modifies the virtual content in response to the detecting that the physical device has performed the command. The modified virtual content indicates that the physical device has performed the command.

In another example embodiment, the AR device receives a confirmation from the physical device that the command has been performed on the physical device. The AR device modifies the virtual content in response to detecting that the physical device has performed the command. The modified virtual content indicates that the physical device has performed the command.

In another example embodiment, the AR device detects, using the optical sensor, a first and a second physical object located within the predefined distance of the physical device, the first and second physical objects being electronically unconnected to the physical device. The AR device determines that the first and second physical objects are associated with the physical device, identifies a first request based on a combination of an identification of the first and second physical objects, the position of the first physical object relative to the physical device, the position of the second physical object relative to the physical device, the orientation of the first physical object relative to the augmented-reality device, and the orientation of the of the second physical object relative to the augmented-reality device. The AR device then communicates the first request to the physical device (or to an electrical device such as a smart plug or a set top box connected to the physical device).

In another example embodiment, the AR device generates a first virtual content to be displayed over at least one of the first and second physical objects, the first virtual content identifying the first request. The AR device generates a second virtual content identifying a second request, the second virtual content including visual instructions illustrating how to move the first and second physical objects to trigger the second request. The AR device displays, in the display, both the first and second virtual content over the first and second physical objects.

In another example embodiment, a non-transitory machine-readable storage device may store a set of instructions that, when executed by at least one processor, causes the at least one processor to perform the method operations discussed within the present disclosure.

FIG. 1 is a block diagram illustrating an example of a network environment 100 suitable for operating an AR device, according to some example embodiments. The network environment 100 includes an AR device 104, a physical device 106, and a server 110 communicatively coupled to each other via a computer network (e.g., the Internet 112).

The physical device 106 includes an electrical device that can be activated and controlled remotely. Examples of the physical device 106 include but are not limited to a computer, a smart phone, a machine, a television, a radio, and a vehicle. In another example embodiment, the physical device 106 may be an electrical or non-electrical device that is not capable of electrical communication with the AR device 104. For example, a conventional lamp is an example of an electrical device having no capability of electrically communicating with other devices such as the AR device 104. A door is an example of a non-electrical device having no capability of electrically communicating with other devices such as the AR device 104. However, the conventional lamp or door are coupled to an electrical device that communicates with the AR device 104. For example, the conventional lamp is connected to a smart switch (e.g., wifi or zwave switch). The door is connected to a wireless controllable mechanical actuator. The AR device 104 can therefore control electrical and non-electrical physical devices through another electrical device (e.g., wi-fi switch, wireless controllable mechanical actuator) capable of controlling the electrical and non-electrical devices and capable of wireless communication with the AR device 104.

The AR device 104 detects the physical device 106 and the physical object 108 and controls the physical device 106 based on the detection of the physical device 106 and physical object 108. The AR device 104 determines that the physical object 108 is associated with the physical device 106 and is located in proximity to the physical device 106. In one example embodiment, the AR device 104 accesses a database of predefined relationships between physical devices 106 and physical objects 108. For example, computer c1 is associated with a mug with logo or design d1, computer c2 is associated with a mug with logo or design d2, machine m1 is associated with tool (e.g., a wrench) t1, machine m2 is associated with tool t2. The database further defines predefined actions or commands between the physical devices 106 and the physical objects 108 and their relative location or placement. For example, command a1 is associated with the mug with design d1 being placed to the right of the computer c1. Command a2 is associated with the mug with design d2 being placed to the right of the computer c1. Command a3 is associated with the mug with design d1 being placed. An action or command may also be associated with the identification of both the physical device 106 and the physical object 108 irrespective of their relative placement. For example, the AR device 104 turns on a television when the AR device 104 detects both the television and the remote control, irrespective of the location of the remote control. The AR device 104 detects the presence of both the television and the remote control using a combination of wireless radio signal and computer vision.

The AR device 104 displays augmented reality information overlaid on top of the physical device 106 or a physical object 108. For example, the user 102 sees a virtual logo on a television network displayed on top of a television when the AR device 104 detects that a remote control is placed face up on a stand next to the user 102.

In one example embodiment, the AR device 104 includes a wearable computing device (e.g., smart glasses, a smart visor, smart eyewear, a smart helmet, a smart phone) that a user 102 can wear to see or experience the AR content related to physical device 106 and the physical object 108, or other predefined physical objects at a specific geographic location or position in a real-world physical environment.

FIG. 1 illustrates an example embodiment of the user 102 looking at or through a display of the AR device 104 to view an AR experience (e.g., augmented information) as an overlay to the physical device 106 and the physical object 108.

The user 102 may be a user of an AR application executed in the AR device 104 or the server 110. The user 102 may be a human user (e.g., a human being), a machine user (e.g., a computer configured by a software program to interact with the AR device 104), or any suitable combination thereof (e.g., a human assisted by a machine or a machine supervised by a human). The user 102 is not part of the network environment 100, but is associated with the AR device 104.

In another example embodiment, the AR device 104 retrieves and communicates a command (e.g., turn on, turn off, change to channel B) directly to the physical device 106 or to an electrical device (e.g., a set top box, a Wi-Fi switch) connected to the physical device 106. In another example embodiment, the AR device 104 communicates the command to the server 110 that is coupled to the physical device 106. For example, the AR device 104 determines that the physical device 106 is made by manufacturer M. The AR device 104 identifies a server 110 associated with the manufacturer M and provides the command to the identified server 110.

The AR device 104, the physical device 106, and the server 110 may each be implemented in a computer system, in whole or in part, as described below with respect to FIG. 15.

The server 110 may be part of a network-based system. For example, the network-based system may be or include a cloud-based server system that provides AR content (e.g., AR experience including three-dimensional (3D) models of virtual objects, animations, images, and video) to the AR device 104.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 15. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices.

The computer network (e.g., the Internet 112) may be any network that enables communication between or among machines (e.g., physical device 106, server 110), databases, and devices (e.g., AR device 104). Accordingly, the computer network may be a wired network, a wireless network (e.g., a mobile or cellular network), or any suitable combination thereof. The computer network may include one or more portions that constitute a private network, a public network (e.g., the Internet 112), or any suitable combination thereof.

Figure 2:
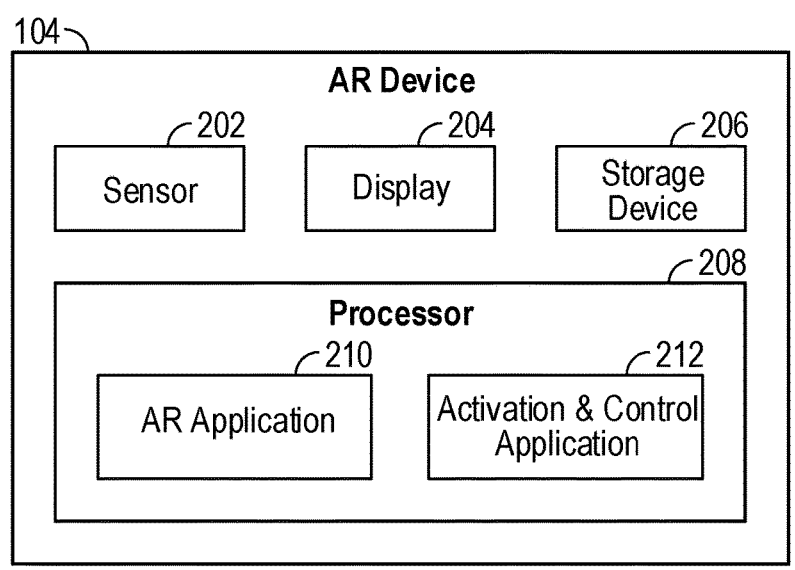
FIG. 2 is a block diagram illustrating modules (e.g., components) of an augmented reality device, according to some example embodiments.

FIG. 2 is a block diagram illustrating an example embodiment of the AR device 104. The AR device 104 may be a wearable device that includes sensors 202, a display 204, a storage device 206, and a processor 208. The AR device 104 may include any type of device that can be worn on the head of a user (e.g., the user 102) such as glasses, a headband, a hat, or a visor.

The sensors 202 may be used to generate internal tracking data (e.g., using gyroscope data, accelerometer data, or inertial motion unit data) of the AR device 104 to determine a position and an orientation of the AR device 104. The position and the orientation of the AR device 104 may be used to identify real-world objects in a field of view of the AR device 104. For example, a virtual object may be rendered and displayed in the display 204 when the sensors 202 indicate that the AR device 104 detects or is oriented towards a predefined real-world object (e.g., when the user 102 looks at the physical device 106 using the AR device 104). In another example, the AR device 104 displays a virtual object (also referred to as augmented information, virtual content, synthetic content) based on a current geographic location of the AR device 104 and the physical object 108. For example, a specific virtual content and command are respectively displayed and issued at the user 102's home address. On the other hand, another virtual content and command are respectively displayed and issued when the user 102 is located at his or her work address. Therefore, different virtual content and command can be configured based on the geographic location of the AR device 104, the physical device 106, and the physical object 108, the identification of the physical device 106, and the physical object 108, the relative position and location between the AR device 104, the physical device 106, and the physical object 108.

Examples of sensors 202 include a camera, an audio sensor, an inertial motion unit (IMU) sensor, a geographic location sensor, a barometer, a humidity sensor, an ambient light sensor, and a biometric sensor. It is to be noted that the sensors 202 described herein are for illustration purposes. The sensors 202 are thus not limited to the ones described.

The display 204 includes a display surface or lens capable of displaying AR content (e.g., an image of a virtual display or monitor) generated by the processor 208. The display 204 may be transparent so that the user 102 can see through the display 204 (e.g., such as a head-up display).

The storage device 206 stores a library of physical device identifiers, physical object identifiers, AR content, commands, geographic locations, relative locations and positions, a profile of the user 102. The AR content include two- or three-dimensional models of virtual objects with or without corresponding audio. In another example, the storage device 206 may also store a database that identifies reference objects (visual references or unique identifiers associated with the physical device 106, physical object 108) and corresponding AR content (e.g., animations, 3D virtual objects, or interactive features of the 3D virtual objects).

In one example embodiment, the AR device 104 communicates over the Internet 112 with the server 110 to access a database of information related to the physical device 106 and physical object 108 from the server 110, commands related to the identified physical device 106 and physical object 108 and their relative placement, location, and position.

The processor 208 includes an AR application 210 and an activation & control application 212. The AR application 210 generates a display of virtual content when the AR device 104 detects the physical device 106 and the physical object 108 associated with the physical device 106 is in proximity to the physical device 106.

The application & control application 212 detects the presence of the physical device 106 (e.g., via computer vision, visual object recognition, or wireless means such as Bluetooth or Zwave) and the presence of the physical object 108 associated with the physical device 106. After detecting the presence of the physical device 106, and that the associated physical object 108 is in proximity to the physical device 106, the physical device control application 212 communicates a command to the physical device 106 or the server 110 to activate or operate the physical device 106.

Figure 3:
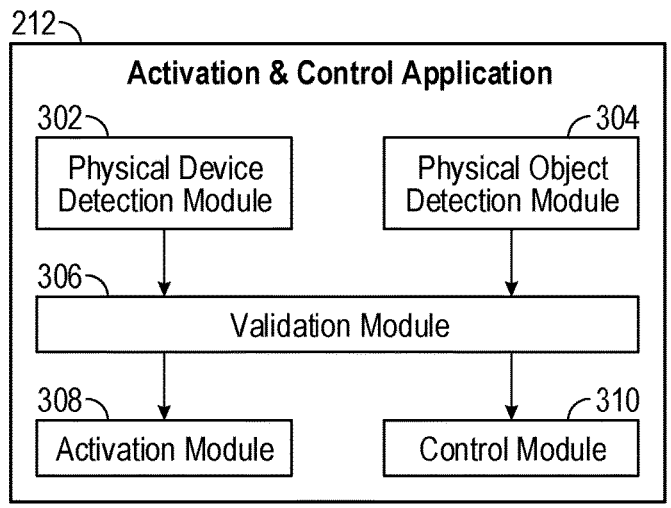
FIG. 3 is a block diagram illustrating modules (e.g., components) of a physical device & control application, according to some example embodiments.

FIG. 3 is a block diagram illustrating modules (e.g., components) of the application & control application 212, according to some example embodiments. The application & control application 212 includes a physical device detection module 302, a physical object detection module 304, a validation module 306, an activation module 308, and a control module 310. The physical device detection module 302 detects the presence of the physical device 106 (e.g., using computer vision, wireless communication signal such as Wi-Fi or Zwave). For example, the physical device detection module 302 detects and identifies the physical device 106. In addition, the physical device detection module 302 determines a distance between the AR device 104 and the physical device 106, a geographic location of the physical device 106, a relative position between the physical device 106 and the AR device 104, an orientation of the physical device 106 relative to the AR device 104 (e.g., television facing away from the AR device 104).

The physical object detection module 304 detects the presence of the physical object 108 (e.g., using computer vision or wireless communication signal such as Bluetooth or Zwave). The physical object detection module 304 detects and identifies the physical object 108. In addition, the physical object detection module 304 determines a distance between the AR device 104 and the physical object 108, a geographic location of the physical object 108, a relative position between the physical object 108, the physical device 106, and the AR device 104 (e.g., the physical object 108 is to the right of the physical device 106 and in front of the AR device 104), an orientation of the physical object 108 relative to the physical device 106 and/or the AR device 104 (e.g., remote control is face up and aimed at the television).

The validation module 306 receives information related to the identification, location, and position of the physical device 106 and the physical object 108 respectively from the physical device detection module 302 and the physical object detection module 304. The validation module 306 retrieves AR content and a command (e.g., turn on, turn off, start application A, switch channel) associated with the received information. For example, the validation module 306 retrieves a command and a particular AR content associated with the physical object 108 determined to be present within a predefined distance (e.g., 5 feet) from the physical device 106. In another example, the validation module 306 retrieves another command and another AR content associated with the physical object 108 determined to be positioned in a particular orientation relative to the physical device 106 or the AR device 104.

The server module 308 uses the information received from the physical device detection module 302 to identify a server 110 associated with the physical device 106. For example, the server module 308 accesses a server 110 associated with the physical device 106. In another example, the server module 308 accesses a server 110 associated with the AR device 104 to identify another server 110 associated with the physical device 106. The server module 308 receives the command from the validation module 306 and communicates the command to the identified server 110.

The physical device interface module 310 receives the command from the validation module 306 and communicates the command (e.g., via the internet 112 or via a direct wireless communication means such as radio) to the physical device 106. For example, the control module 310 sends a command or operation to turn off a radio (physical device 106).

Figure 4:
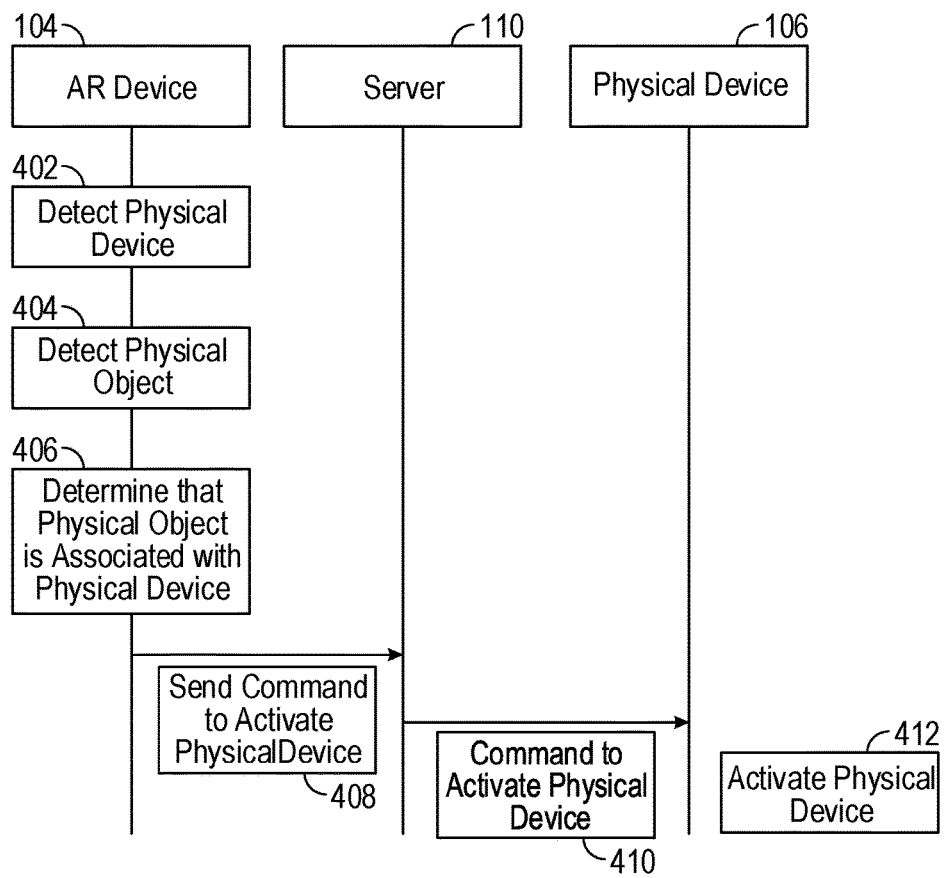
FIG. 4 is a block diagram illustrating interactions between an augmented reality device, a server, and a physical device, according to some example embodiments.

FIG. 4 is a block diagram illustrating interactions between the AR device 104, the server 110, and the physical device 106, according to some example embodiments. At operation 402, the AR device 104 detects the physical device 106 using computer vision or other wireless communication signal between the physical device 106 and the AR device 104. At operation 404, the AR device 104 detects the physical object 108 using computer vision recognition techniques or other wireless communication signal between the physical object 108 and the AR device 104 (e.g., Bluetooth tag on the physical object 108). At operation 406, the AR device 104 determines that the physical object 108 is associated with the physical device 106. The AR device 104 retrieves a command (e.g., activate physical device 106) based on the associated physical object 108 and sends a request or instructions to activate the physical object 108 to the server 110 (associated with the physical device 106) at operation 408. At operation 410, the server 110 sends the command to activate the physical device 106 to the physical device 106. At operation 412, the physical device 106 is activated in response to receiving the command.

Figure 5:
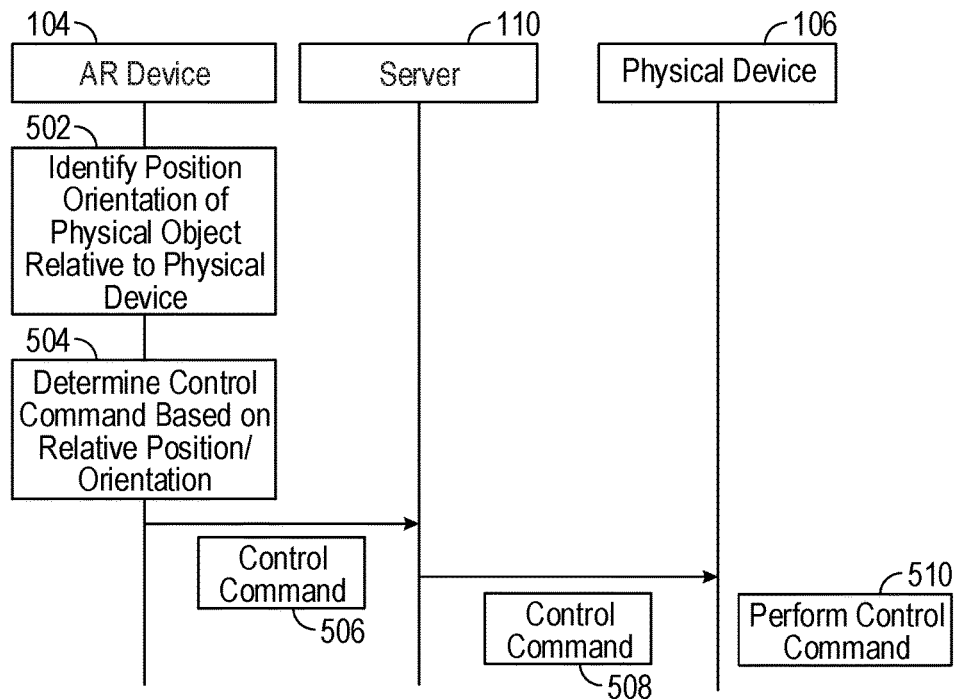
FIG. 5 is a block diagram illustrating interactions between an augmented reality device, a server, and a physical device, according to some example embodiments.

FIG. 5 is a block diagram illustrating interactions between the AR device 104, the server 110, and the physical device 106, according to some example embodiments. At operation 502, the AR device 104 identifies a position and orientation of the physical object 108 relative to the physical device 106 (e.g., one foot to the left of the physical device 106, and pointed in a particular direction). At operation 504, the AR device 104 determines that a control or command based on the relative location and position between the physical object 108 and the physical device 106. At operation 506, AR device 104 sends the command to the server 110 (associated with the physical device 106). At operation 508, the server 110 sends the command to the physical device 106. At operation 510, the physical device 106 performs the command in response to receiving the command from the server 110.

Figure 6:
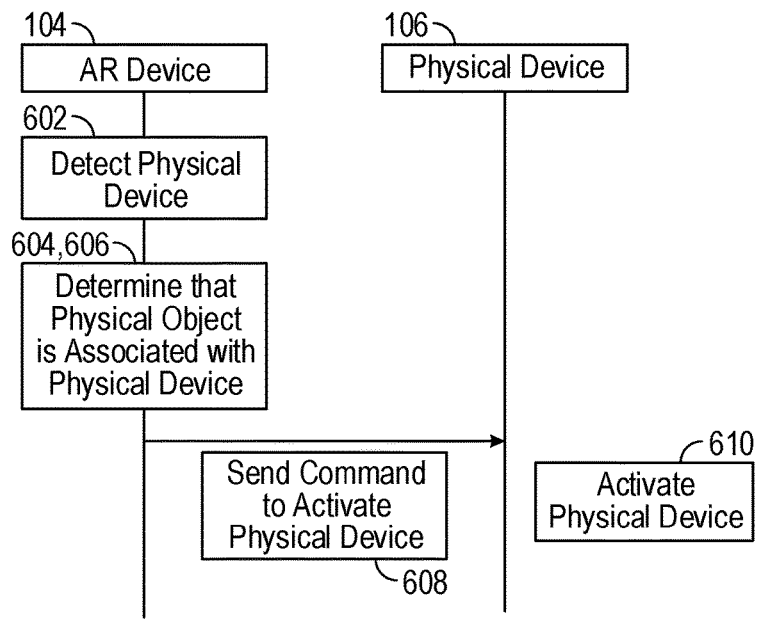
FIG. 6 is a block diagram illustrating interactions between an augmented reality device and a physical device, according to some example embodiments.

FIG. 6 is a block diagram illustrating interactions between the AR device 104 and the physical device 106, according to some example embodiments. At operation 602, the AR device 104 detects the presence of the physical device 106 using computer vision or other wireless communication signal between the physical device 106 and the AR device 104. At operation 604, the AR device 104 detects the physical object 108 using computer vision recognition techniques or other wireless communication signal between the physical object 108 and the AR device 104 (e.g., Bluetooth tag on the physical object 108). At operation 606, the AR device 104 determines that the physical object 108 is associated with the physical device 106. The AR device 104 retrieves a command (e.g., activate physical device 106) based on the associated physical object 108 and sends a request or instructions to activate the physical object 108 to the physical device 106 at operation 608. At operation 610, the physical device 106 is activated in response to receiving the command from the AR device 104.

Figure 7:
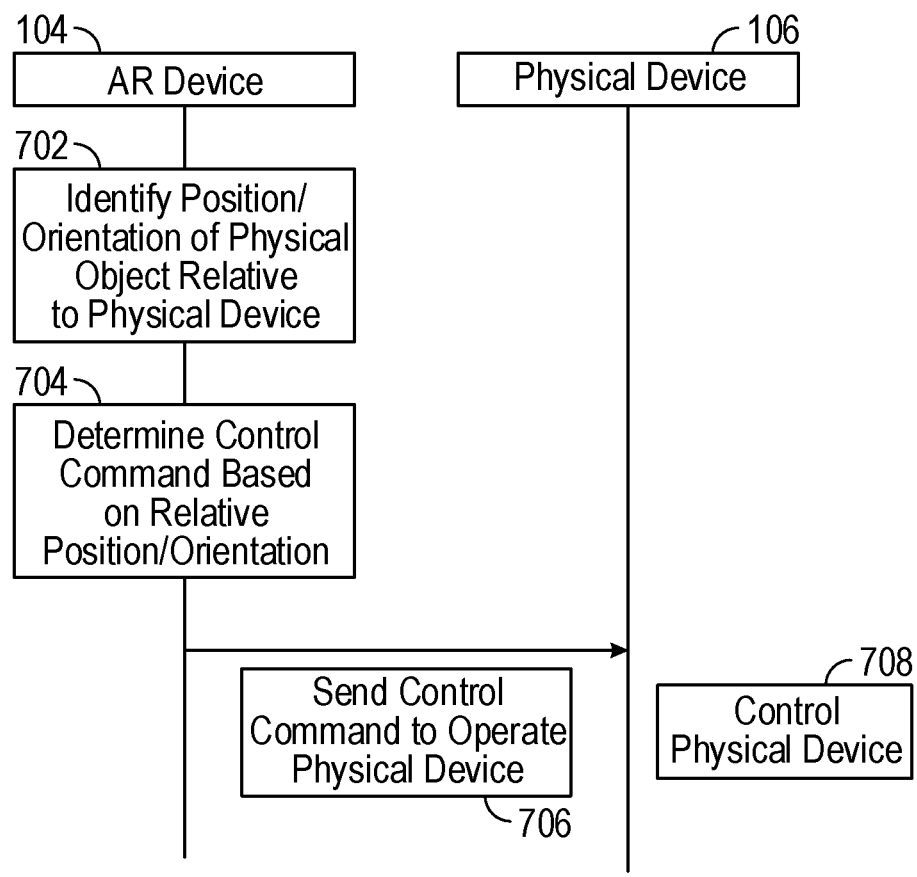
FIG. 7 is a block diagram illustrating interactions between an augmented reality device and a physical device, according to some example embodiments.

FIG. 7 is a block diagram illustrating interactions between an augmented reality device 104 and a physical device 106, according to some example embodiments. At operation 702, the AR device 104 identifies a position and orientation of the physical object 108 relative to the physical device 106 (e.g., one foot to the left of the physical device 106, and pointed in a particular direction). At operation 704, the AR device 104 determines that a control or command based on the relative location and position between the physical object 108 and the physical device 106. At operation 706, the AR device 104 sends the command to the physical device 106. At operation 708, the physical device 106 performs the command in response to receiving the command from the AR device 104.

Figure 8:
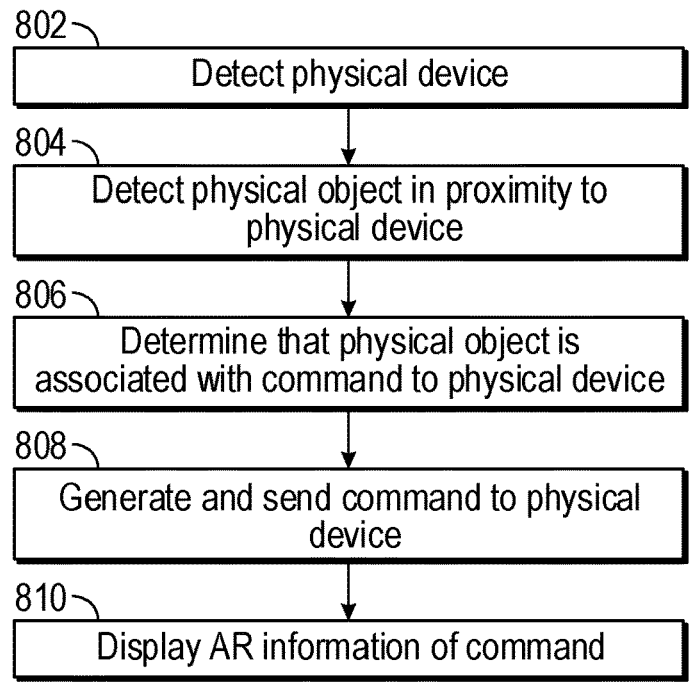
FIG. 8 is a flowchart illustrating an example operation of a physical device control application, according to some example embodiments.

FIG. 8 is a flowchart illustrating an example operation of the physical device control application 212, according to some example embodiments. At operation 802, the physical activation & control application 212 detects the presence of the physical device 106 and identifies the physical device 106. In one example embodiment, operation 802 is implemented with the physical device detection module 302. At operation 804, the physical device control application 212 identifies the physical object 108 and detects that the physical object 108 is in proximity (e.g., adjacent or 5 feet away) to the physical device 106. In one example embodiment, operation 804 is implemented with the physical object detection module 304. At operation 806, the physical device control application 212 determines that the physical object 108 is associated with a command. In one example embodiment, operation 806 is implemented with the validation module 306. At operation 808, the physical device control application 212 sends the command to the physical device 106. In one example embodiment, operation 808 is implemented with the physical device interface module 310. At operation 810, the AR device 104 displays AR content based on the command. In one example embodiment, operation 810 is implemented with the AR application 210. For example, the AR content includes virtual content identifying or illustrating a command based on the position or placement of the physical object 108 relative to the physical device 106. In another example, the AR content includes illustration on how to manipulate the physical object 108 to perform another command.

Figure 9:
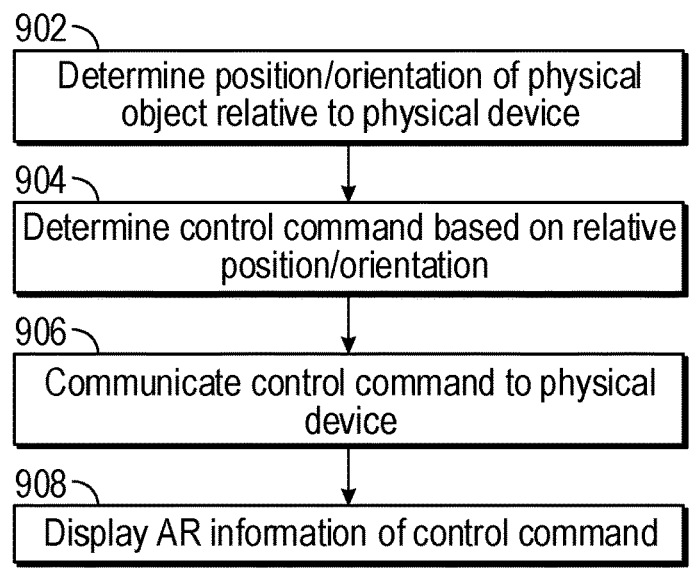
FIG. 9 is a flowchart illustrating another example operation of a physical device control application, according to some example embodiments.

FIG. 9 is a flowchart illustrating another example operation of the application & control application 212, according to some example embodiments. At operation 902, the physical device control application 212 determines the position and orientation of the physical object 108 relative to the physical device 106 (and optionally relative to the AR device 104). In one example embodiment, operation 902 is implemented with the physical device detection module 302 and the physical object detection module 304. At operation 904, the application & control application 212 determines a command based on the relative position and orientation of the physical object 108. In one example embodiment, operation 904 is implemented with the validation module 306. At operation 906, the physical device control application 212 communicates the command to the physical device 106. In one example embodiment, operation 906 is implemented with the physical device interface module 310. At operation 908, the AR device 104 displays AR content based on the command. In one example embodiment, operation 908 is implemented with the AR application 210.

Figure 10:
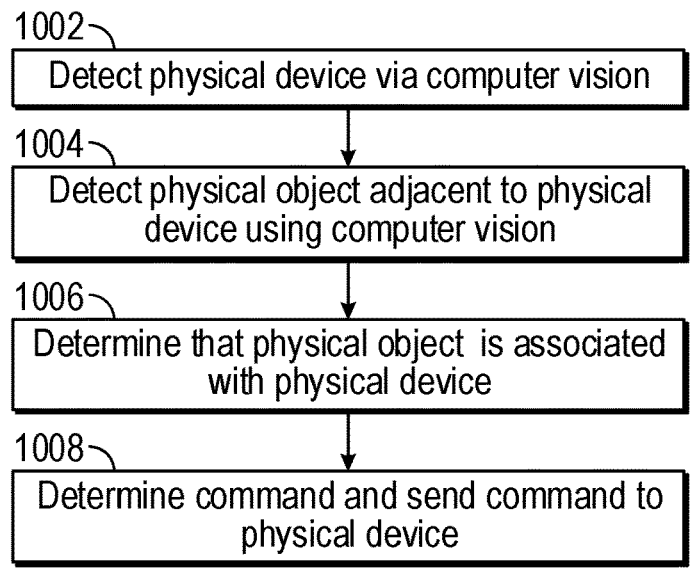
FIG. 10 is a flowchart illustrating another example operation of a physical device control application, according to some example embodiments.

FIG. 10 is a flowchart illustrating another example operation of the application & control application 212, according to some example embodiments. At operation 1002, the application & control application 212 detects the physical device 106 using computer vision techniques. In one example embodiment, operation 1002 is implemented with the physical device detection module 302. At operation 1004, the application & control application 212 detects that the physical object 108 (associated with physical device 106) is adjacent to the physical device 106, using computer vision techniques. In one example embodiment, operation 1002 is implemented with the physical object detection module 304. At operation 1006, the application & control application 212 detects that the physical object 108 is associated with the physical device 106. In one example embodiment, operation 1006 is implemented with the validation module 306. At operation 1008, the application & control application 212 determines a command based on detecting that the physical object 108 is adjacent to the physical device 106. In one example embodiment, operation 1008 is implemented with the validation module 306.

Figure 11:
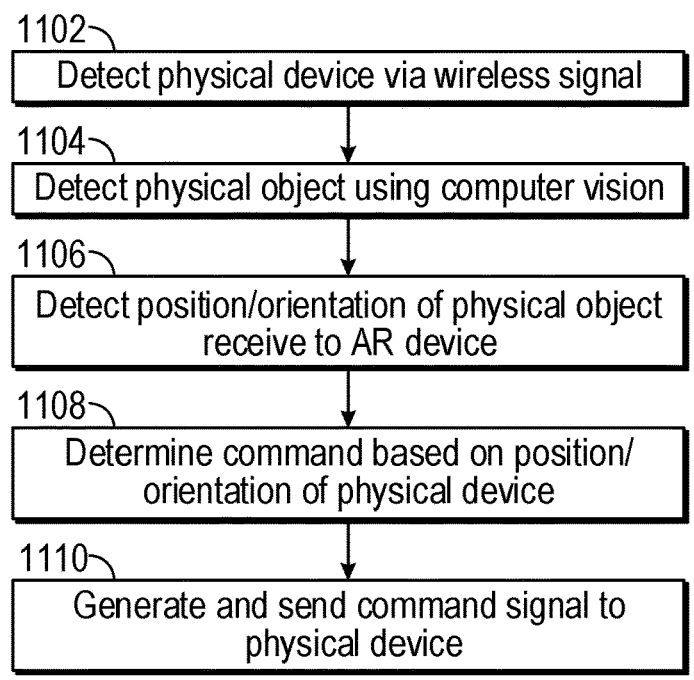
FIG. 11 is a flowchart illustrating another example operation of a physical device control application, according to some example embodiments.

FIG. 11 is a flowchart illustrating another example operation of an activation and control application, according to some example embodiments. At operation 1102, the application & control application 212 detects the physical device 106 using wireless communication between the AR device 104 and the physical device 106. In one example embodiment, operation 1102 is implemented with the physical device detection module 302. At operation 1104, the application & control application 212 detects the physical object 108 (associated with physical device 106), using computer vision techniques. In one example embodiment, operation 1104 is implemented with the physical object detection module 304. At operation 1106, the application & control application 212 determines the position and orientation of the physical object 108 relative to the AR device 104. In one example embodiment, operation 1106 is implemented with the physical device detection module 302 and the physical object detection module 304. At operation 1108, the physical device control application 212 determines a command based on the position and orientation of the physical object 108. In one example embodiment, operation 1108 is implemented with the validation module 306. At operation 1110, the application & control application 212 communicates the command to the physical device 106. In one example embodiment, operation 1110 is implemented with the physical device interface module 310.

Figure 12A:
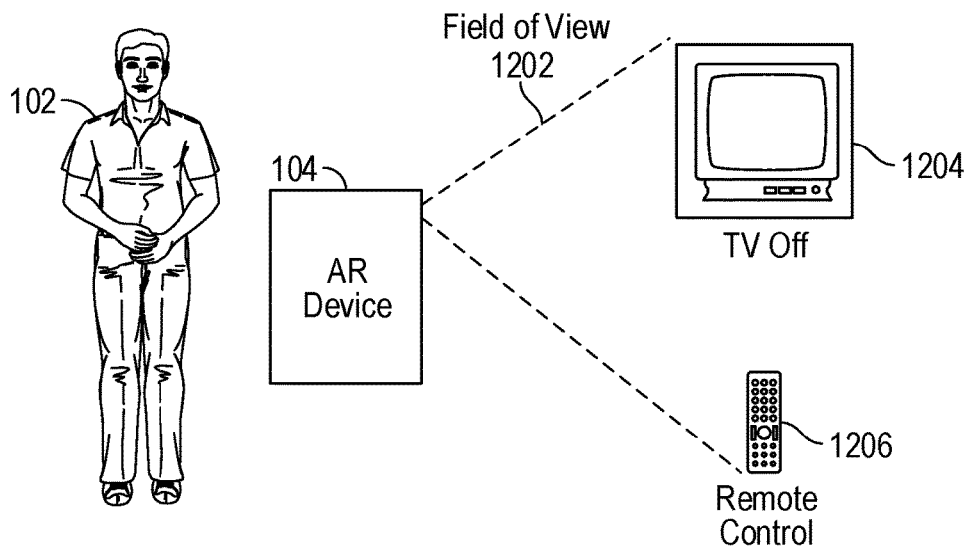
FIG. 12A is a block diagram illustrating an example of an operation of an augmented reality device for controlling a television.
Figure 12B:
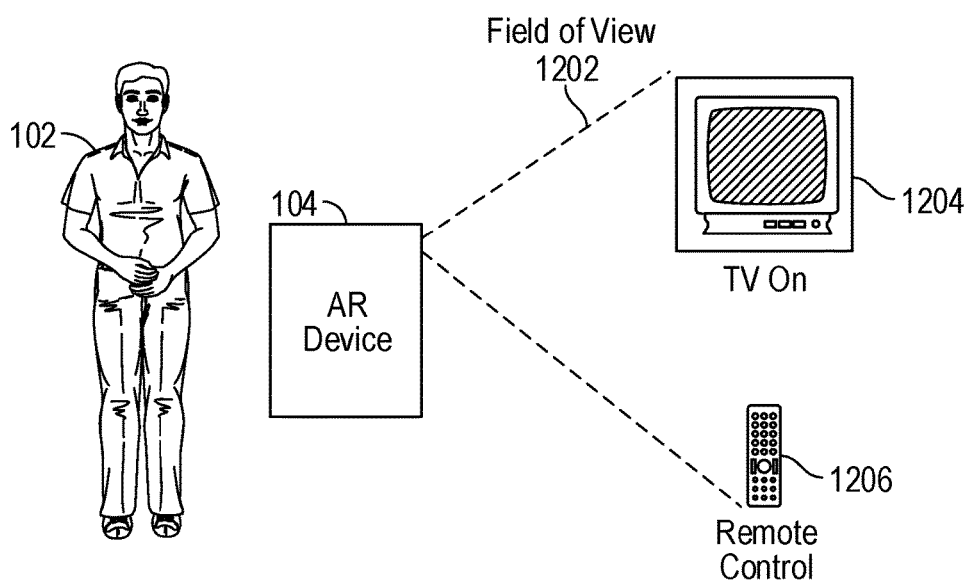
FIG. 12B is a block diagram illustrating an example of an operation of an augmented reality device for controlling a television.

FIGS. 12A, 12B are block diagrams illustrating examples of operation of an augmented reality device for controlling a television. The user 102 uses the AR device 104 to detect a television 1204 and a remote control 1206 associated with the television 1204. In one example embodiment, the AR device 104 visually detects the television 1204 and the remote control 1206 both located within a field of view 1202 of an optical sensor of the AR device 104. The AR device 104 identifies that the remote control 1206 is associated with the television 1204. The AR device 104 further determines that the remote control 1206 is adjacent or in proximity (or within a predefined distance) to the television 1204. The AR device 104 further detects the orientation of the remote control 1206 relative to the television 1204. FIGS. 12A and 12B both illustrate the remote control 1206 having different orientation. The AR device 104 determines a command based on the position and orientation of the remote control 1206 and sends the command to the television 1204. In the example of FIG. 12A, the AR device 104 sends a "turn off" signal to the television 1204 based on the orientation of the remote control 1206. In the example of FIG. 12B, the AR device 104 sends a "turn on" signal to the television 1204 based on the orientation of the remote control 1206. It is noted that the user 102 did not activate or press any buttons on the remote control 1206 to turn on or off the television 1204.

Figure 13A:
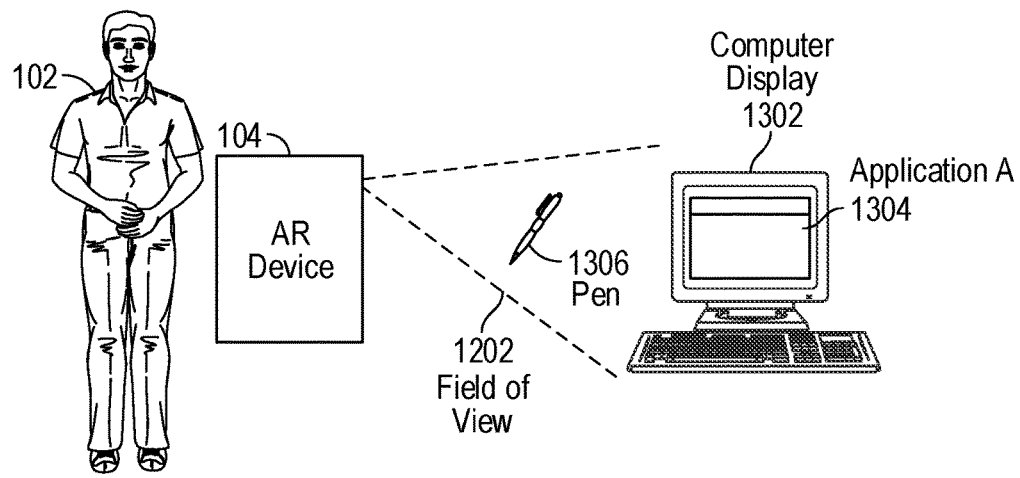
FIG. 13A is a block diagram illustrating an example of an operation of an augmented reality device for controlling a computer.
Figure 13B:
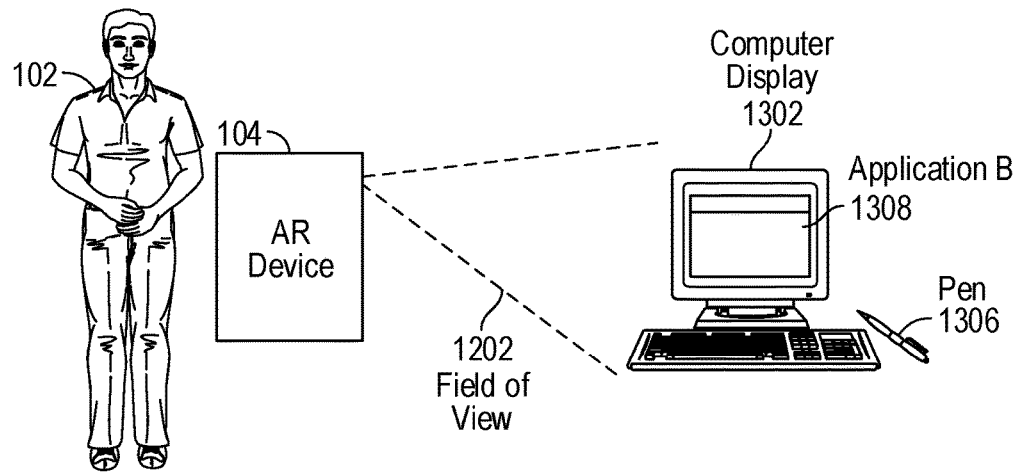
FIG. 13B is a block diagram illustrating another example of an operation of an augmented reality device for controlling a computer.

FIGS. 13A and 13B are block diagrams illustrating examples of an operation of an augmented reality device 104 for controlling a computer. The user 102 uses the AR device 104 to detect and identify a computer display 1302 and a pen 1306 associated with the computer display 1302. The computer display 1302 displays an application A 1304 running on a computer (not shown) connected to the computer display 1302. In one example embodiment, the AR device 104 visually detects that the computer display 1302 and the pen 1306 are both located within a field of view 1202 of an optical sensor of the AR device 104. The AR device 104 identifies that the pen 1306 is associated with the computer or computer display 1302. The AR device 104 further determines that the pen 1306 is adjacent (or within a predefined distance) and placed to the left of the computer display 1302. FIGS. 13A and 13B both illustrate the pen 1306 in different positions (e.g., to the left, to the right) relative to the computer display 1302. The AR device 104 determines a command based on the location of the pen 1306 relative to the computer display 1302 and sends the command to the computer connected to the computer display 1302. In the example of FIG. 13A, the AR device 104 sends a signal to run application A 1304 on the computer connected to the computer display 1302 based on detecting that the pen 1306 is located to the left of the computer display 1302. In the example of FIG. 13B, the AR device 104 sends a signal to run application B 1308 in the computer connected to the computer display 1302 based on detecting that the pen 1306 is located to the right of the computer display 1302.

Figure 14A:
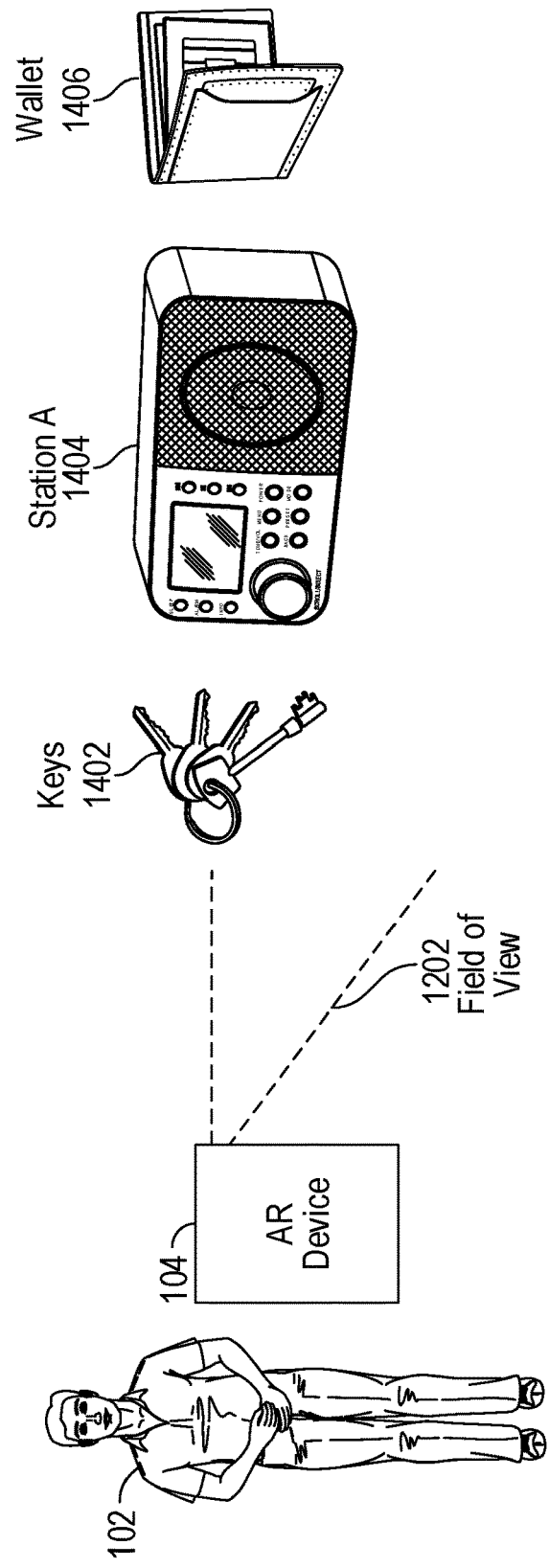
FIG. 14A is a block diagram illustrating an example of an operation of an augmented reality device for controlling a radio.
Figure 14B:
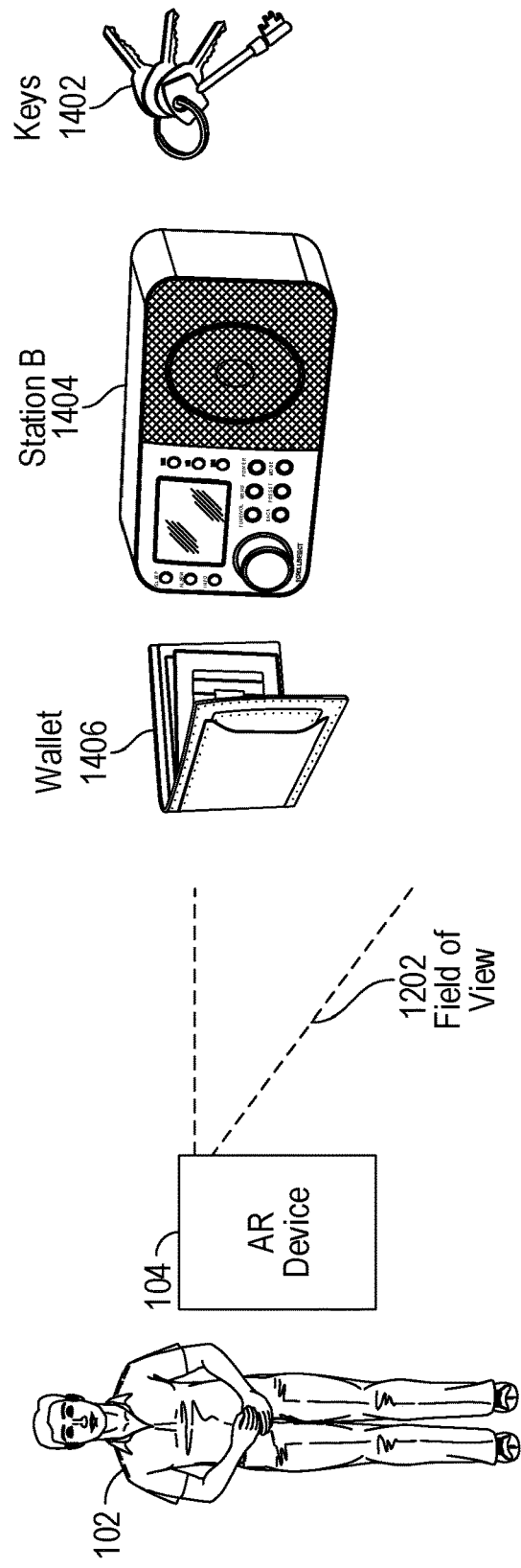
FIG. 14B is a block diagram illustrating another example of an operation of an augmented reality device for controlling a radio.

FIGS. 14A and 14B are block diagrams illustrating an example of an operation of an augmented reality device 104 for controlling a radio. The user 102 uses the AR device 104 to detect and identify a radio 1404, keys 1402, and a wallet 1406. The AR device 104 determines that the keys 1402 and wallet 1406 are associated with the radio 1404 (for example, using unique visual or electronic identifiers on the keys 1402 and wallet 1406). The radio 1404 is tuned in to station A based on the placement of the detected keys 1402 and wallet 1406. In the present example, the AR device 104 visually detects that the keys 1402, the radio 1404, and the wallet 1406 are located within a field of view 1202 of an optical sensor of the AR device 104. The AR device 104 identifies that the position/placement of the keys 1402 and wallet 1406 relative to the radio 1404. FIGS. 14A and 14B both illustrate the keys 1402 and wallet 1406 in different positions (e.g., to the left, to the right) relative to the radio 1404. The AR device 104 determines a command based on the location of the keys 1402 and wallet 1406 relative to the radio 1404 and sends the command to the radio 1404. In the example of FIG. 14A, the AR device 104 sends a signal to the radio 1404 to tune to station A based on detecting that the keys 1402 are placed to the left of the radio 1404 and the wallet 1406 is placed to the right of the radio 1404. In the example of FIG. 14B, the AR device 104 sends a signal to the radio 1404 to tune to station B based on detecting that the keys 1402 are placed to the right of the radio 1404 and the wallet 1406 is placed to the left of the radio 1404.

Figure 14C:
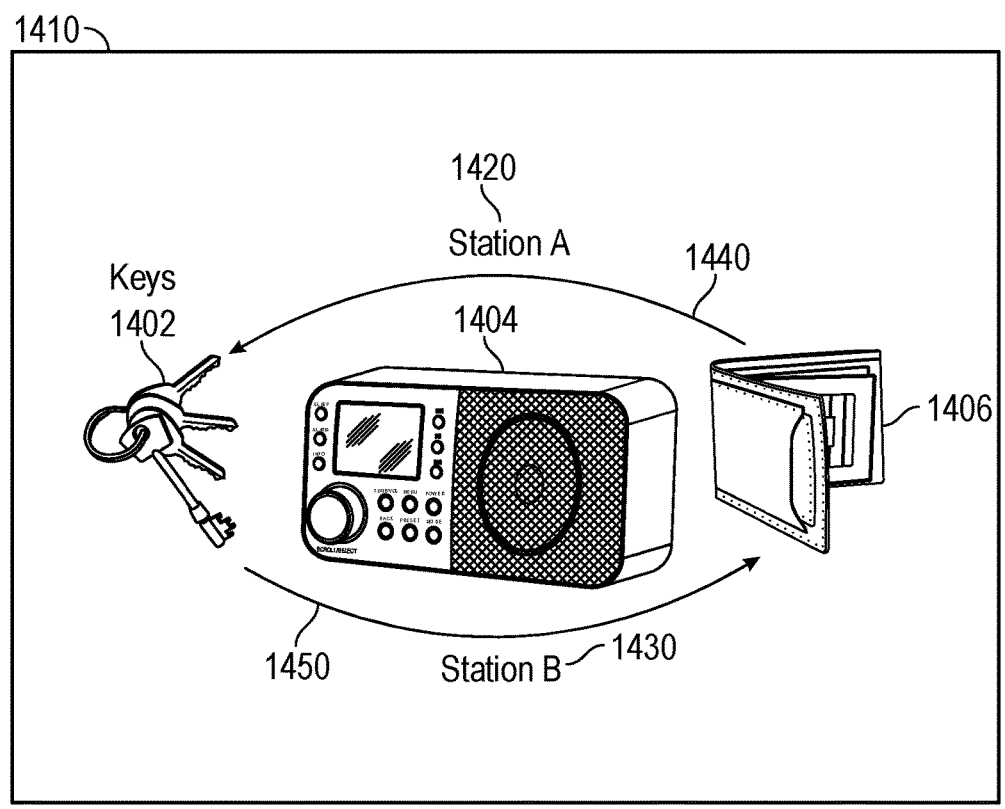
FIG. 14C is a block diagram illustrating an example of an augmented reality display for controlling a radio.

FIG. 14C is a block diagram illustrating an example of an augmented reality display for controlling a radio 1404. A display 1410 of the AR device 104 displays AR content overlaid on real world physical object 108 (e.g., radio 1404). The AR content includes a radio station identification 1420 (e.g., logo of the station) that appears to be above the radio 1404. The AR content also includes illustrations or guide 1440, 1450 on moving the keys 1402 and wallet 1406 to change the radio 1404 to station B 1430.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers 110. A client and server 110 are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 15:
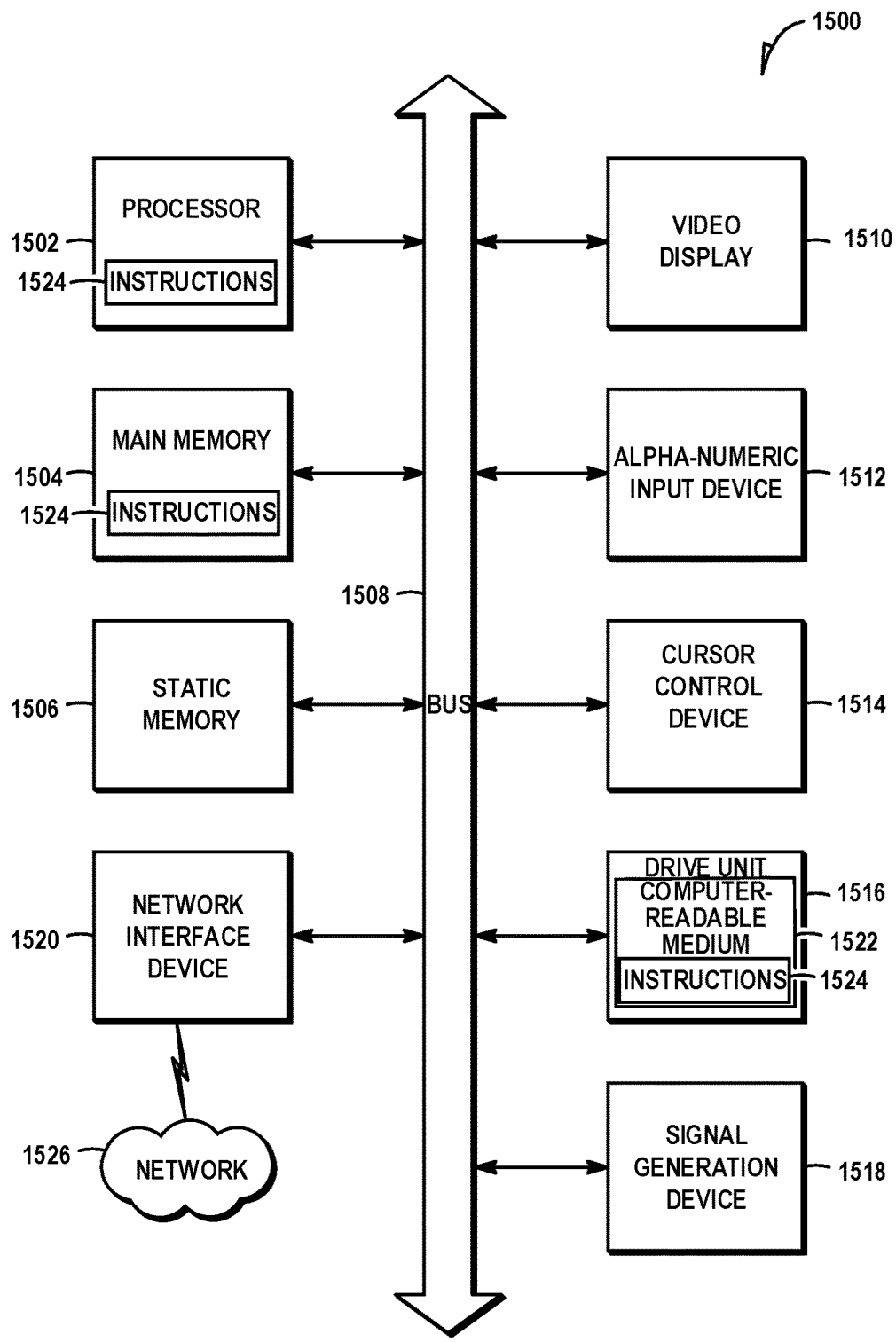
FIG. 15 is a block diagram illustrating components of a machine, according to some example embodiments, able to read instructions from a machine-readable medium and perform any one or more of the methodologies discussed herein.

FIG. 15 is a block diagram of a machine in the example form of a computer system 1500 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server 110 or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1504 and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard), a user interface (UI) navigation (or cursor control) device 1514 (e.g., a mouse), a disk drive unit 1516, a signal generation device 1518 (e.g., a speaker) and a network interface device 1520.

Machine-Readable Medium

The disk drive unit 1516 includes a machine-readable medium 1522 on which is stored one or more sets of data structures and instructions 1524 (e.g., software) embodying or utilized by any one or more of the methodologies or functions described herein. The instructions 1524 may also reside, completely or at least partially, within the main memory 1504 and/or within the processor 1502 during execution thereof by the computer system 1500, the main memory 1504 and the processor 1502 also constituting machine-readable media 1522. The instructions 1524 may also reside, completely or at least partially, within the static memory 1506.

While the machine-readable medium 1522 is shown in an example embodiment to be a single medium, the term "machine-readable medium" may include a single medium or multiple media (e.g., a centralized or distributed database, and/or associated caches and servers 110) that store the one or more instructions 1524 or data structures. The term "machine-readable medium" shall also be taken to include any tangible medium that is capable of storing, encoding or carrying instructions 1524 for execution by the machine and that cause the machine to perform any one or more of the methodologies of the present embodiments, or that is capable of storing, encoding or carrying data structures utilized by or associated with such instructions 1524. The term "machine-readable medium" shall accordingly be taken to include, but not be limited to, solid-state memories, and optical and magnetic media. Specific examples of machine-readable media 1522 include non-volatile memory, including by way of example semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1524 may further be transmitted or received over a communications network 1526 using a transmission medium. The instructions 1524 may be transmitted using the network interface device 1520 and any one of a number of well-known transfer protocols (e.g., HTTP). Examples of communication networks include a LAN, a WAN, the Internet, mobile telephone networks, POTS networks, and wireless data networks (e.g., Wi-Fi and WiMAX networks). The term "transmission medium" shall be taken to include any intangible medium capable of storing, encoding, or carrying instructions 1524 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An augmented-reality device comprising:
    an optical sensor;
    a display; and
    one or more hardware processors comprising a physical device control application, the physical device control application configured to perform operations comprising:
        detecting a physical device located within a first predefined distance of the augmented-reality device;
        detecting, using the optical sensor, a physical object located within a second predefined distance of the physical device, the physical object being electronically unconnected to the physical device;
        determining that the physical object is associated with the physical device;
        identifying a command based on an identification of both the physical object and the physical device, the physical device configured to operate the command; and
        displaying, in the display, virtual content as an overlay to the physical object, the virtual content identifying the command.

2. The augmented-reality device of claim 1, wherein the operations further comprise:
    determining, using the optical sensor, a position of the physical object relative to the physical device, a first orientation of the physical object relative to the augmented-reality device, and a second orientation of the physical object relative to the physical device,
    wherein the command is identified based on a combination of the identification of the physical object, the position of the physical object relative to the physical device, the first orientation of the physical object relative to the augmented-reality device, and the second orientation of the physical object relative to the physical device.

3. The augmented-reality device of claim 1, wherein the operations further comprise:
    identifying, using the optical sensor, the physical device and the physical object; and
    determining, using the optical sensor, that the physical object is adjacent to the physical device,
    wherein the command is based on the identification of both the physical device and the physical object, and the physical object being adjacent to the physical device.

4. The augmented-reality device of claim 1, wherein the operations further comprise:
    wirelessly communicating with the physical device;
    identifying the physical device based on the wireless communication between the augmented reality device and the physical device; and
    determining, using the optical sensor, that the physical object is adjacent to the physical device,
    wherein the command is based on the identification of both the physical device and the physical object, and the physical object being adjacent to the physical device.

5. The augmented-reality device of claim 4, wherein the operations further comprise:
    communicating the command to the physical device using the wireless communication.

6. The augmented-reality device of claim 1, wherein the operations further comprise:
    communicating the command to a server, the server associated with the physical device and coupled to the physical device.

7. The augmented-reality device of claim 1, wherein the operations further comprise:
    detecting that the physical device has performed the command on the physical device; and
    modifying the virtual content in response to the detecting that the physical device has performed the command, the modified virtual content indicating that the physical device has performed the command.

8. The augmented-reality device of claim 1, wherein the operations further comprise:
    receiving a confirmation from the physical device that the command has been performed on the physical device; and
    modifying the virtual content in response to the detecting that the physical device has performed the command, the modified virtual content indicating that the physical device has performed the command.

9. The augmented-reality device of claim 1, wherein the operations further comprise:
    detecting, using the optical sensor, a first and a second physical object located within the predefined distance of the physical device, the first and second physical objects being electronically unconnected to the physical device;
    determining that the first and second physical objects are associated with the physical device;
    identifying a first request based on a combination of an identification of the first and second physical objects, the position of the first physical object relative to the physical device, the position of the second physical object relative to the physical device, the orientation of the first physical object relative to the augmented-reality device, and the orientation of the of the second physical object relative to the augmented-reality device; and
    communicating the first request to the physical device.

10. The augmented-reality device of claim 1, wherein the operations further comprise:
    generating a first virtual content to be displayed over at least one of the first and second physical objects, the first virtual content identifying the first request;

generating a second virtual content identifying a second request, the second virtual content including visual instructions illustrating how to move the first and second physical objects to trigger the second request; and displaying, in the display, both the first and second virtual content over the first and second physical objects.

11. A method comprising:

detecting a physical device located within a first predefined distance of an augmented-reality device;

detecting, using an optical sensor of the augmented-reality device, a physical object located within a second predefined distance of the physical device, the physical object being electronically unconnected to the physical device;

determining, using a hardware processor of the augmented-reality device, that the physical object is associated with the physical device;

identifying a command based on an identification of both the physical object and the physical device, the physical device configured to operate the command; and displaying, in a display of the augmented-reality office, virtual content as an overlay to the physical object, the virtual content identifying the command.

12. The method of claim 11, further comprising:

determining, using the optical sensor, a position of the physical object relative to the physical device, a first orientation of the physical object relative to the augmented-reality device, and a second orientation of the physical object relative to the physical device, wherein the command is identified based on a combination of the identification of the physical object, the position of the physical object relative to the physical device, the first orientation of the physical object relative to the augmented-reality device, and the second orientation of the physical object relative to the physical device.

13. The method of claim 11, further comprising:

identifying, using the optical sensor, the physical device and the physical object; and determining, using the optical sensor, that the physical object is adjacent to the physical device, wherein the command is based on the identification of both the physical device and the physical object, and the physical object being adjacent to the physical device.

14. The method of claim 11, further comprising:

wirelessly communicating with the physical device;

identifying the physical device based on the wireless communication between the augmented reality device and the physical device; and determining, using the optical sensor, that the physical object is adjacent to the physical device, wherein the command is based on the identification of both the physical device and the physical object, and the physical object being adjacent to the physical device.

15. The method of claim 14, further comprising:

communicating the command to the physical device using the wireless communication or to a server, the server associated with the physical device and coupled to the physical device.

16. The method of claim 11, further comprising:

detecting that the physical device has performed the command on the physical device; and modifying the virtual content in response to the detecting that the physical device has performed the command, the modified virtual content indicating that the physical device has performed the command.

17. The method of claim 11, further comprising:

receiving a confirmation from the physical device that the command has been performed on the physical device; and modifying the virtual content in response to the detecting that the physical device has performed the command, the modified virtual content indicating that the physical device has performed the command.

18. The method of claim 11, further comprising:

detecting, using the optical sensor, a first and a second physical object located within the predefined distance of the physical device, the first and second physical objects being electronically unconnected to the physical device;

determining that the first and second physical objects are associated with the physical device;

identifying a first request based on a combination of an identification of the first and second physical objects, the position of the first physical object relative to the physical device, the position of the second physical object relative to the physical device, the orientation of the first physical object relative to the augmented-reality device, and the orientation of the of the second physical object relative to the augmented-reality device; and communicating the first request to the physical device.

19. The augmented-reality device of claim 1, wherein the operations further comprise:

generating a first virtual content to be displayed over at least one of the first and second physical objects, the first virtual content identifying the first request;

generating a second virtual content identifying a second request, the second virtual content including visual instructions illustrating how to move the first and second physical objects to trigger the second request; and displaying, in the display, both the first and second virtual content as an overlay over the first and second physical objects.

20. A non-transitory machine-readable medium comprising instructions that, when executed by one or more processors of a machine, cause the machine to perform operations comprising:

detecting a physical device located within a first predefined distance of an augmented-reality device;

detecting, using an optical sensor of the augmented-reality device, a physical object located within a second predefined distance of the physical device, the physical object being electronically unconnected to the physical device;

determining, using a hardware processor of the augmented-reality device, that the physical object is associated with the physical device;

identifying a command based on an identification of both the physical object and the physical device, the physical device configured to operate the command; and displaying, in a display of the augmented-reality office, virtual content as an overlay to the physical object, the virtual content identifying the command.

* * * * *

UNITED STATES PATENT AND TRADEMARK OFFICE
CERTIFICATE OF CORRECTION

PATENT NO. : 10,212,000 B1  
APPLICATION NO. : 15/659180  
DATED : February 19, 2019  
INVENTOR(S) : Frank Chester Irving, Jr.

Page 1 of 1

It is certified that error appears in the above-identified patent and that said Letters Patent is hereby corrected as shown below:

On the Title Page

Item (22), in Column 1, Line 1, after "Jul. 25, 2017", insert --¶(65) Prior Publication Data US 2019/0036726 A1 Jan. 31, 2019--

Signed and Sealed this  
Second Day of June, 2020

Andrei Iancu  
*Director of the United States Patent and Trademark Office*